(12) United States Patent
Watanabe

(10) Patent No.: US 6,327,612 B1
(45) Date of Patent: Dec. 4, 2001

(54) ELECTRONIC MAIL TRANSMISSION WITH SELECTIVE FILE ATTACHMENT

(75) Inventor: Takeshi Watanabe, Yokohama (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/219,107

(22) Filed: Dec. 22, 1998

(30) Foreign Application Priority Data

Jan. 22, 1998 (JP) .................................................. 10-010237

(51) Int. Cl.⁷ ...................................................... G06F 13/00
(52) U.S. Cl. ............................................................ 709/206
(58) Field of Search .................................... 709/205–206, 709/232, 238; 707/10, 200; 340/506, 825.08; 358/402; 345/335; 455/500

(56) References Cited

U.S. PATENT DOCUMENTS

| | | | | |
|---|---|---|---|---|
| 5,754,306 | * | 5/1998 | Taylor et al. | 358/400 |
| 5,765,170 | * | 6/1998 | Morikawa | 707/200 |
| 5,771,355 | * | 6/1998 | Kuzma | 709/232 |
| 5,818,447 | * | 10/1998 | Wolf et al. | 345/335 |
| 5,892,909 | * | 4/1999 | Grasso et al. | 709/201 |
| 5,903,723 | * | 5/1999 | Beck et al. | 707/10 |
| 5,930,479 | * | 6/1999 | Hall | 709/238 |
| 5,956,486 | * | 9/1999 | Hickman et al. | 340/825.08 |
| 6,014,688 | * | 1/2000 | Venkatraman et al. | 709/206 |
| 6,025,931 | * | 2/2000 | Bloomfield | 358/402 |
| 6,085,101 | * | 7/2000 | Jain et al. | 455/500 |
| 6,105,056 | * | 8/2000 | Gilchrist et al. | 709/206 |
| 6,147,601 | * | 11/2000 | Sandelman et al. | 340/506 |

* cited by examiner

*Primary Examiner*—David Wiley
(74) *Attorney, Agent, or Firm*—A. Bruce Clay; Carstens, Yee & Cahoon L.L.P.

(57) ABSTRACT

A mailing apparatus is operated to associate an attachment file with TO addresses. Then, the mailing apparatus creates e-mail destined for the TO addresses each including the body text and the TO addresses, together with e-mail destined for the CC/BCC addresses including the body text and the CC/BCC addresses. Further, the mailing apparatus appends the attachment files to the e-mail destined for the TO addresses, whereas it does not append the attachment files to the e-mail destined for the CC/BCC addresses. Instead, it appends a message to the latter to indicate the attachment files have been attached to the e-mail destined for the TO addresses.

20 Claims, 8 Drawing Sheets

FIG. 4A

To: addr1
Cc: addr2, addr3
Bcc:

Subject: Hello

Hello

FIG. 4B

To: addr1
Cc: addr2, addr3
Bcc:

Append Attachment File

Subject: Hello

Hello

FIG. 4C

To: addr1
Cc: addr2, addr3
Bcc:

Subject: Hello

Hello

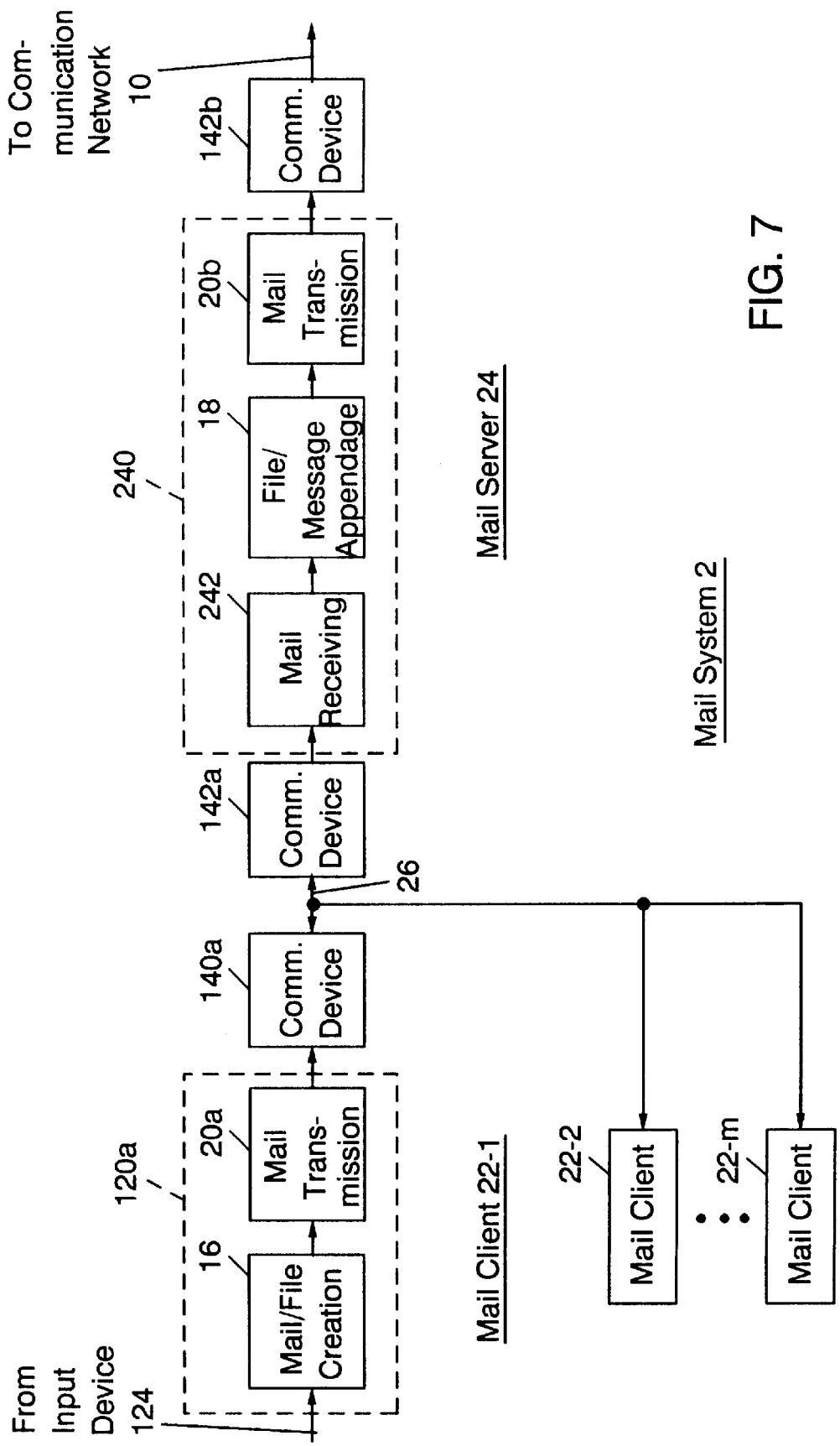

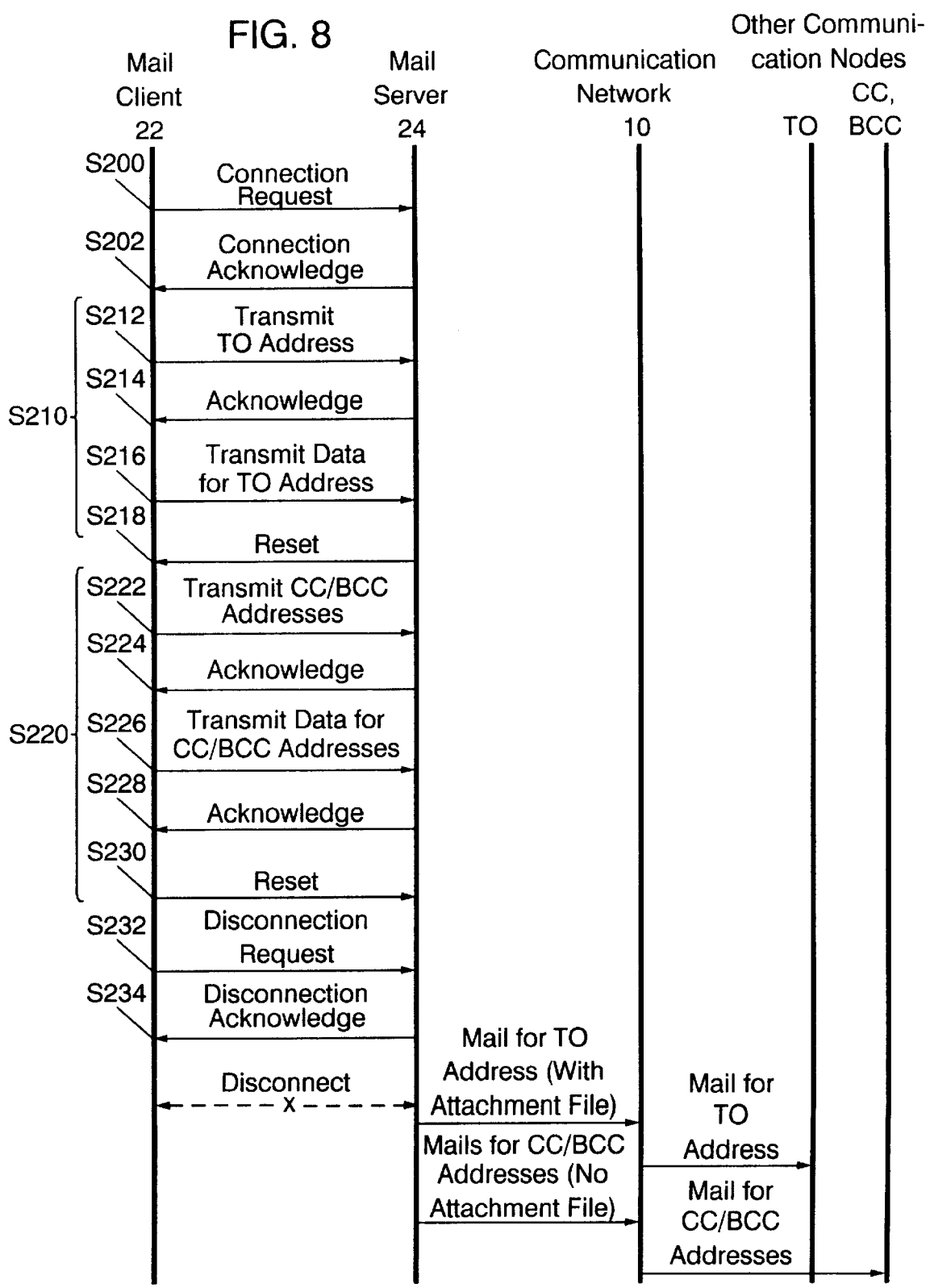

ELECTRONIC MAIL TRANSMISSION WITH SELECTIVE FILE ATTACHMENT

FIELD OF THE INVENTION

This invention relates to an electronic-mail (e-mail) transmission apparatus and a method thereof adapted for selectively attaching data files to e-mails for each of individual recipients (i.e., on a recipient-selective basis) for transmission thereto.

BACKGROUND OF THE INVENTION

E-mail apparatuses, which are capable of transmitting e-mails with attached data files (attachment files), have been widely used in the art. In conventional e-mail however, attachment files are transmitted to all of the designated addresses without exception and, thus, there has been no way to limit attachment files to a portion of the recipients (e.g., one or more "TO addresses" identifying one or more primary recipients). Thus, e-mail with attachment files is transmitted to other addresses as well (i.e., one or more "CC addresses" and/or "BCC addresses" identifying one or more secondary recipients). For the sake of brevity, each of these addresses (TO, CC and BCC) and their identifying recipients (primary, secondary) is generally represented in a plural form unless otherwise specifically noted. Also, for the same reason, these addresses (TO, CC and BCC) or any combinations thereof will be alternatively called "TO, CC, BCC addresses" or "CC/BCC addresses" in a simpler form.

Even if a sender does not feel it necessary to send attachment files to secondary recipients, or the secondary recipients do not feel it necessary to receive information other than the e-mails' body text, such e-mail with attachment files are nevertheless transmitted to all of the recipients. This also leads to undesirable phenomena such as congestion in a network used for transmitting the e-mail and/or overflow of memory for storing the received e-mail.

Japanese Patent Publication 8-251221 discloses a message handling method, wherein recipients' addresses are divided into a plurality of groups set up in e-mail such that text is attached to e-mail for transmission to each of the grouped recipients' addresses. In accordance with this method, however, it is possible to attach text only to e-mail, whereas it is not possible to attach another type of data (e.g., binary data, programs or the like) other than the text data. Also, in this method, it is mandatory to write character patterns for associating the grouped recipients' addresses with the attached text data into the e-mails and, therefore, it becomes much troublesome to create such e-mails in comparison with sole attachment of data files.

Moreover, recipients who are not identified to receive attached text do not know who else received the attached text. Accordingly, except where a sender describes such a fact within the e-mail in an explicit manner, those recipients who receive e-mail without any attached text are unable to know existence of the text even if the recipients need to receive it.

SUMMARY OF THE INVENTION

In view of the aforementioned problems of the prior art, it is an object of this invention to provide an e-mail transmission apparatus and a method thereof capable of transmitting e-mail with selectively appended attachment files to only those recipients who need to receive the attachment files, even if a sender of the e-mail designates primary addresses (TO addresses) together with secondary addresses (CC/BCC addresses), respectively.

More specifically, it is another object of this invention to provide an e-mail transmission apparatus and a method thereof capable of transmitting e-mail including a text body plus one or more attachment files to primary recipients having the TO addresses, and of simultaneously transmitting e-mail each including the text body plus a message to secondary recipients having the CC/BCC addresses, thereby to inform the secondary recipients of the fact that the attachment files have been transmitted to the TO addresses.

It is yet another object of this invention to provide an e-mail transmission apparatus and a method thereof capable of transmitting e-mail with selectively appended attachment files to a plurality of recipients identified in the e-mail on a recipient-selective basis, thereby to avoid undesirable phenomena such as congestion in a network used for transmitting the e-mail or overflow of memory for storing the received e-mail. It is yet another object of this invention to provide an e-mail transmission apparatus and a method thereof capable of transmitting e-mail with selectively appended attachment files to each of the recipients in order to allow the recipients to visibly confirm which of the attachment files has been transmitted to which of the recipients.

It is yet another object of this invention to provide an transmission apparatus and a method thereof capable of selectively appending any type of data to e-mail for transmission to recipients. It is yet another object of this invention to provide an e-mail transmission apparatus and a method thereof capable of securely informing those recipients who have received e-mail without attachment files that the attachment files have been transmitted to other recipients.

In order to accomplish these objectives, an electronic-mail (e-mail) transmission apparatus of this invention comprises: address designation accepting means for accepting designation of one or more e-mail addresses; body text accepting means for accepting a body text that is common to e-mail destined for each of said accepted e-mail addresses; attachment file accepting means for accepting one or more attachment files to be attached to the e-mail; address-attachment file associating means for associating one or more subsets of e-mail addresses with each of said accepted attachment files, each said subset including one or more of said accepted e-mail addresses; e-mail creating means for creating the e-mails each being destined for a given one of said subsets of the accepted e-mail addresses, each said e-mail including said accepted body text together with one or more of said attachment files that are associated with a given one of the accepted e-mail addresses; and e-mail transmitting means for transmitting each of said created e-mails.

Preferably, the e-mail transmission apparatus further comprises first message appending means for appending a message to each e-mail that does not have one or more of said accepted attachment files attached thereto for at least indicating the existence of said unattached attachment files.

Preferably, the e-mail transmission apparatus further comprises first address displaying means for displaying each of said subsets of the accepted e-mail addresses in association with a message that indicates each of said attachment files associated with the said subsets.

Preferably, said address designation accepting means accepts designation of one or more e-mail addresses identifying primary recipients of the e-mail (TO addresses), and/or designation of one or more e-mail addresses identifying secondary recipients of the e-mail (secondary addresses); said address-attachment file associating means associates a primary one of said subsets of said e-mail addresses including said TO addresses only and/or a secondary one of said subsets of said e-mail addresses including said secondary addresses only with each of said accepted attachment files; and said e-mail creating means creates e-mails each being destined for a given one of said TO addresses and including said accepted body text together with one or more of said attachment files associated with the said TO addresses, and/or e-mail each being destined for a given one of said secondary addresses and including said accepted body text together with one or more of said attachment files associated with the said secondary addresses.

Preferably, said attachment file accepting means accepts one or more attachment files to be attached to the e-mail that is destined for said TO addresses; said address-attachment file associating means associates said TO addresses with said accepted attachment files; and said e-mail creating means creates e-mails each being destined for a given one of said TO addresses and including said accepted body text together with said attachment files associated with the said TO addresses, and/or e-mails each being destined for a given one of said secondary addresses and including said accepted body text.

Preferably, the e-mail transmission apparatus further comprises second message appending means, which is operative in a case where said attachment files have been attached to the e-mail destined for said TO addresses, for appending a message to each e-mail destined for said secondary addresses, thereby indicating that said attachment files have been attached to the e-mail destined for said TO addresses.

Preferably, the e-mail transmission apparatus further comprises second address displaying means for displaying said TO addresses together with said secondary addresses, and for displaying messages indicating said attachment files in association with said displayed TO addresses.

By way of example, the e-mail transmission apparatus of this invention transmits to primary recipients (those recipients identified by the TO addresses), e-mail each including a body text and one or more attachment files, whereas it transmits to secondary recipients (those recipients identified by the CC/BCC addresses), e-mail each including the body text and a message indicating that the attachment files have been attached to the e-mail destined for the primary recipients.

The address designation accepting means is responsive to a user's manipulation, for example, for accepting designation of e-mail addresses, including one or more TO addresses, one or more CC addresses and BCC addresses (i.e., those secondary addresses that are not visible to other recipients) as subsets thereof. The body text accepting means is responsive to a user's manipulation, for example, for accepting a communication message (body text) that is to be commonly transmitted to the recipients who are identified by all of said accepted e-mail addresses.

The attachment file accepting means is responsive to a user's manipulation, for example, for accepting one or more attachment files to be attached to the e-mails that are solely destined for the primary recipients identified by said TO addresses, and for recording the attachment files onto a recording medium such as a hard disk. These attachment files may contain therein any type of data, including but not limited to text data and binary data. In a case where different attachment files are to be attached to the different recipients identified by the TO, CC and BCC addresses respectively, the attachment file accepting means accepts the different attachment files in association with the respective addresses and records them into an appropriate recording medium.

The address-attachment file associating means is responsive to a user's manipulation, for example, for associating the TO addresses accepted by the address designation accepting means with the attachment files accepted by the attachment file accepting means. In a case where different attachment files are to be attached to the different recipients identified by the TO, CC and BCC addresses respectively, the address-attachment file associating means associates the TO, CC and BCC addresses with those attachment files to be transmitted to the recipients identified by these addresses respectively.

The e-mail creating means creates e-mail, each being destined for a given one of the TO, CC and BCC addresses and including a common body text. Also, it appends the attachment files only to e-mail transmitted to the primary recipients identified by the TO addresses. The message appending means appends a message to each e-mail that is to be transmitted to the secondary recipients identified by the CC/BCC addresses to indicate that the attachment files have been attached to the TO addresses. Should there be no attachment file, the e-mail creating means does not perform any file attachment to the e-mail, nor does the message appending means perform any message appendage to the e-mail destined for the CC/BCC addresses.

In a case where different attachment files are to be attached to the different recipients identified by the TO, CC and BCC addresses respectively, the e-mail creating means appends some of the attachment files associated with the TO addresses to e-mail destined for the TO addresses and, as the case may be, the message appending means appends a message to each e-mail destined for the CC/BCC addresses to indicate that the associated attachment files have been attached to the TO addresses. Similarly, the e-mail creating means appends some of the attachment files associated with the CC addresses to e-mail destined for the CC addresses and, as the case may be, the message appending means appends a message to each e-mail destined for the TO and BCC addresses to indicate that the associated attachment files have been attached to the CC addresses.

The e-mail creating means appends some of the attachment files associated with the BCC addresses to e-mail destined for the BCC addresses and, as the case may be, the message appending means appends a message to each e-mail destined for the TO and CC addresses to indicate that the associated attachment files have been attached to the BCC addresses.

The e-mail transmitting means transmits each e-mail created by the e-mail creating means to the respective recipients via a communication circuit.

The address displaying means displays the TO, CC and BCC addresses on a monitor, and it also displays messages that indicate the attachment files associated with the TO addresses in association with the TO addresses for use by a user's confirmation. In a case where different attachment files are to be attached to the different recipients identified by the TO, CC and BCC addresses respectively, the address displaying means displays the TO, CC and BCC addresses, and it also displays messages that indicate the attachment files associated with these addresses respectively.

Further, a mail server apparatus of this invention is adapted for accepting from a mail client apparatus one or more e-mail addresses, a body text that is common to e-mail destined for each of said e-mail addresses and one or more attachment files to be attached to the e-mail, and for transmitting the e-mail using them, which comprises: address-attachment file associating means for associating one or more subsets of e-mail addresses with each of said accepted attachment files, each said subset including one or more of said accepted e-mail addresses; e-mail creating means for creating e-mail each being destined for a given one of said subsets of the accepted e-mail addresses, each said e-mail including said accepted body text together with one or more of said attachment files that are associated with a given one of the accepted e-mail addresses; and e-mail transmitting means for transmitting each said created e-mail.

Further, a mail client apparatus of this invention is adapted for outputting to a mail server apparatus one or more e-mail addresses, a body text that is common to e-mail destined for each of said e-mail addresses and one or more attachment files to be attached to the e-mail, thereby enabling the mail server apparatus to accept one or more subsets of e-mail addresses, each of the subsets including one or more of said e-mail addresses, and said attachment files, to create the e-mail each being destined for a given one of said subsets of the accepted e-mail addresses, each said e-mail including said body text together with one or more of said attachment files that are associated with a given one of the accepted e-mail addresses, and to transmit each of said created e-mail. The mail client apparatus comprises: address designation accepting means for accepting designation of one or more e-mail addresses; body text accepting means for accepting a body text that is common to e-mail destined for each of said accepted e-mail addresses; and attachment file accepting means for accepting one or more attachment files to be attached to the e-mail.

Further, an e-mail transmission method of this invention comprises the steps of: (a) accepting designation of one or more e-mail addresses; (b) accepting a body text that is common to e-mail destined for each of said accepted e-mail addresses; (c) accepting one or more attachment files to be attached to the e-mail; (d) associating one or more subsets of e-mail addresses with each of said accepted attachment files, each said subset including one or more of said accepted e-mail addresses; (e) creating the e-mail each being destined for a given one of said subsets of the accepted e-mail addresses, each said e-mail including said accepted body text together with one or more of said attachment files that are associated with a given one of the accepted e-mail addresses; and (f) transmitting each said created e-mail.

Preferably, said step (a) accepts designation of one or more e-mail addresses identifying primary recipients of the e-mail (TO addresses), and/or designation of one or more e-mail addresses identifying secondary recipients of the e-mail (secondary addresses); said step (d) associates a primary one of said subsets of said e-mail addresses including said TO addresses only and/or a secondary one of said subsets of said e-mail addresses including said secondary addresses only with each of said accepted attachment files; and said step (e) creates e-mail being destined for a given one of said TO addresses and including said accepted body text together with one or more of said attachment files associated with the said TO addresses, and/or e-mail being destined for a given one of said secondary addresses and including said accepted body text together with one or more of said attachment files associated with the said secondary addresses.

Further, a computer readable storage medium of this invention is adapted for storing a program that is executable by the computer to carry out method steps of: (a) accepting designation of one or more e-mail addresses; (b) accepting a body text that is common to e-mail destined for each of said accepted e-mail addresses; (c) accepting one or more attachment files to he attached to the e-mail; (d) associating one or more subsets of e-mail addresses with each of said accepted attachment files, each said subset including one or more of said accepted e-mail addresses; (e) creating the e-mail each being destined for a given one of said subsets of the accepted e-mail addresses, each said e-mail including said accepted body text together with one or more of said attachment files that are associated with a given one of the accepted e-mail addresses; and (f) transmitting each said created e-mail.

BRIEF DESCRIPTION OF THE DRAWINGS

For a more complete understanding of the present invention and for further advantages thereof, reference is now made to the following Detailed Description taken in conjunction with the accompanying Drawings, in which:

FIGS. 4A, 4B and 4C illustrate input manipulations of address-selective file appendage information;

FIG. 7 is a diagram showing configuration of a mail system that is used in place of a communication node in the environment of the communication system (FIG. 1); and FIG. 8 is a communication sequence diagram showing signals transmitted among the mail client, mail server and communication network in the environment of the mail system shown in FIG. 7.

DETAILED DESCRIPTION OF THE INVENTION

Figure 1:
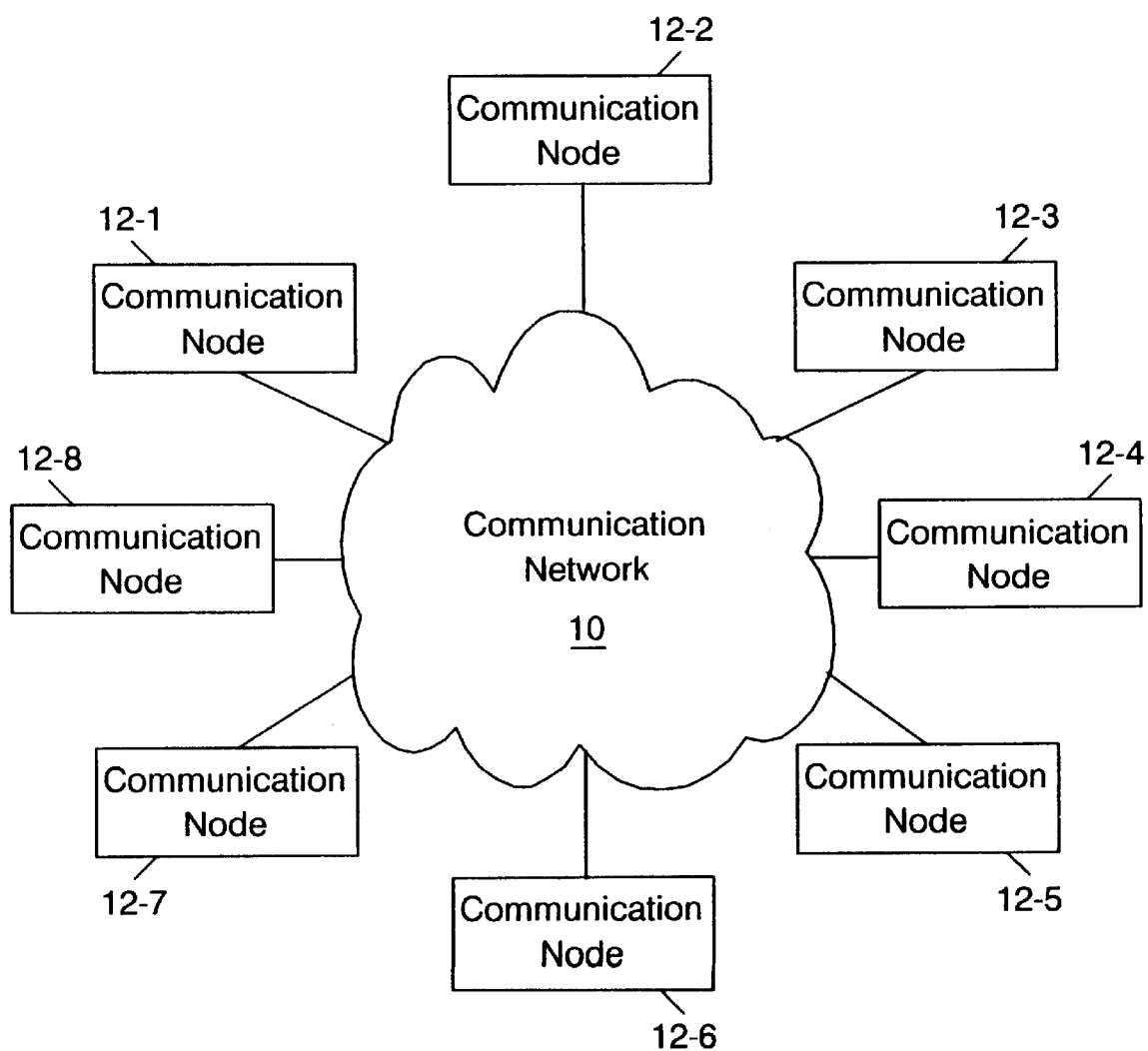
FIG. 1 is a diagram illustrating a communication network wherein a mail transmission method of this invention may be applied.

Now, assuming an exemplary environment where communication nodes for transmitting/receiving mail are directly coupled to a communication network, a first embodiment of the present invention will be described. FIG. 1 illustrates a configuration of a communication System 1, wherein a mail transmission method of this invention may be applied. As shown, system 1 comprises N communication nodes 12-1 to 12-N (FIG. 1 shows a case of N=8), coupled to a communication network 10. With these constituents, system 1 transmits e-mail among arbitrary communication nodes 12 (hereinafter, when an arbitrary one of the communication nodes 12-1 to 12-N is referred to, it will be simply called "communication node 12") via the communication network 10.

The network 10 may be an ISDN communication network, a data leased circuit, a telephone circuit or the like, and includes apparatus such as mail servers for processing and distributing e-mail from sending communication nodes 12 to identified receiving communication nodes 12.

Figure 2:
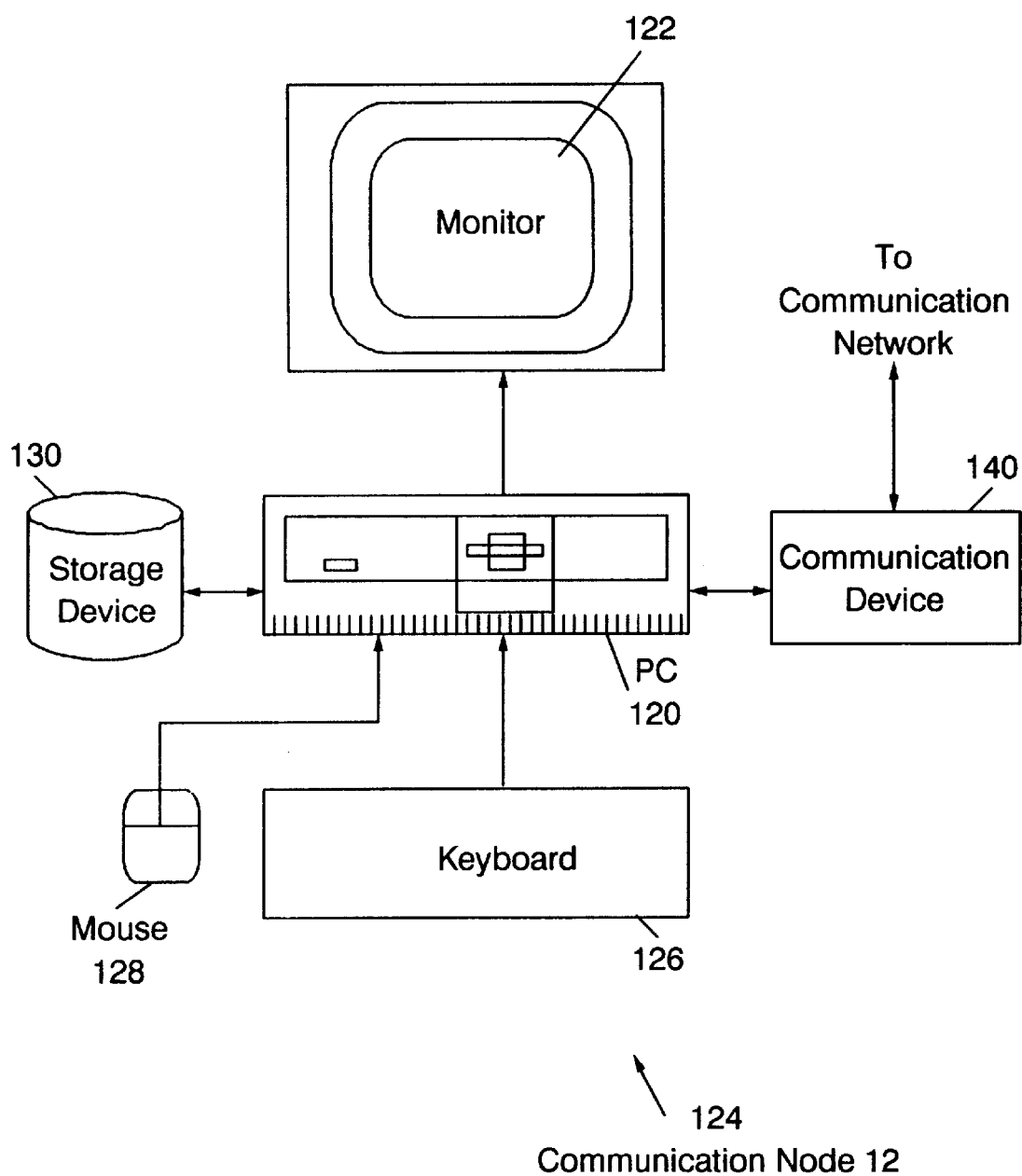
FIG. 2 is a diagram showing a configuration of a communication node as shown in FIG. 1.

FIG. 2 shows a configuration of a communication node 12 shown in FIG. 1. As shown, node 12 comprises a computer system unit (PC) 120, a monitor 122, an input device 124 including a keyboard 126 and a mouse 128, a storage device 130 and a communication device 140.

Node 12, with these constituents, may function as a personal computer for supporting data communication, thereby to receive e-mail transmitted from another communication node 12 via the communication network 10.

Also, responsive to attributes of mail addresses, node 12 creates e-mail each which may include one or more attachment files and e-mail each which may include an appended message (mark) for indicating existence of the attachment files, and then, it transmits the created e-mail to an identified receiving communication node via the communication network 10.

Unit 120 may be a system unit of a personal computer, comprising a CPU, a memory and peripheral circuits thereof (not shown), which is arranged to execute software such as a mail transmission program 14 (to be described later with reference to FIG. 3). Monitor 122 is a CRT display device or a liquid crystal display device, which displays GUI images inputted from the computer system unit 120 for mail transmission by the mail transmission program 14, as well as contents of received e-mail or the like. The keyboard 126 and mouse 128 accept a user's manipulation that is performed in response to a GUI image displayed on the monitor 122 and/or data representing an inputted text or the like, thereby to output same to the computer system unit 120.

Storage device 130 may be a readable/writable storage device such as a hard disk drive (HDD) or a floppy disk drive (FDD), which stores data input from the computer system unit 120 and regenerates data requested by the computer system unit 120 for output to the computer system unit 120. Communication device 140 may be a modem or a terminal adaptor, which transmits data between the communication network 10 and the computer system unit 120.

Figure 3:
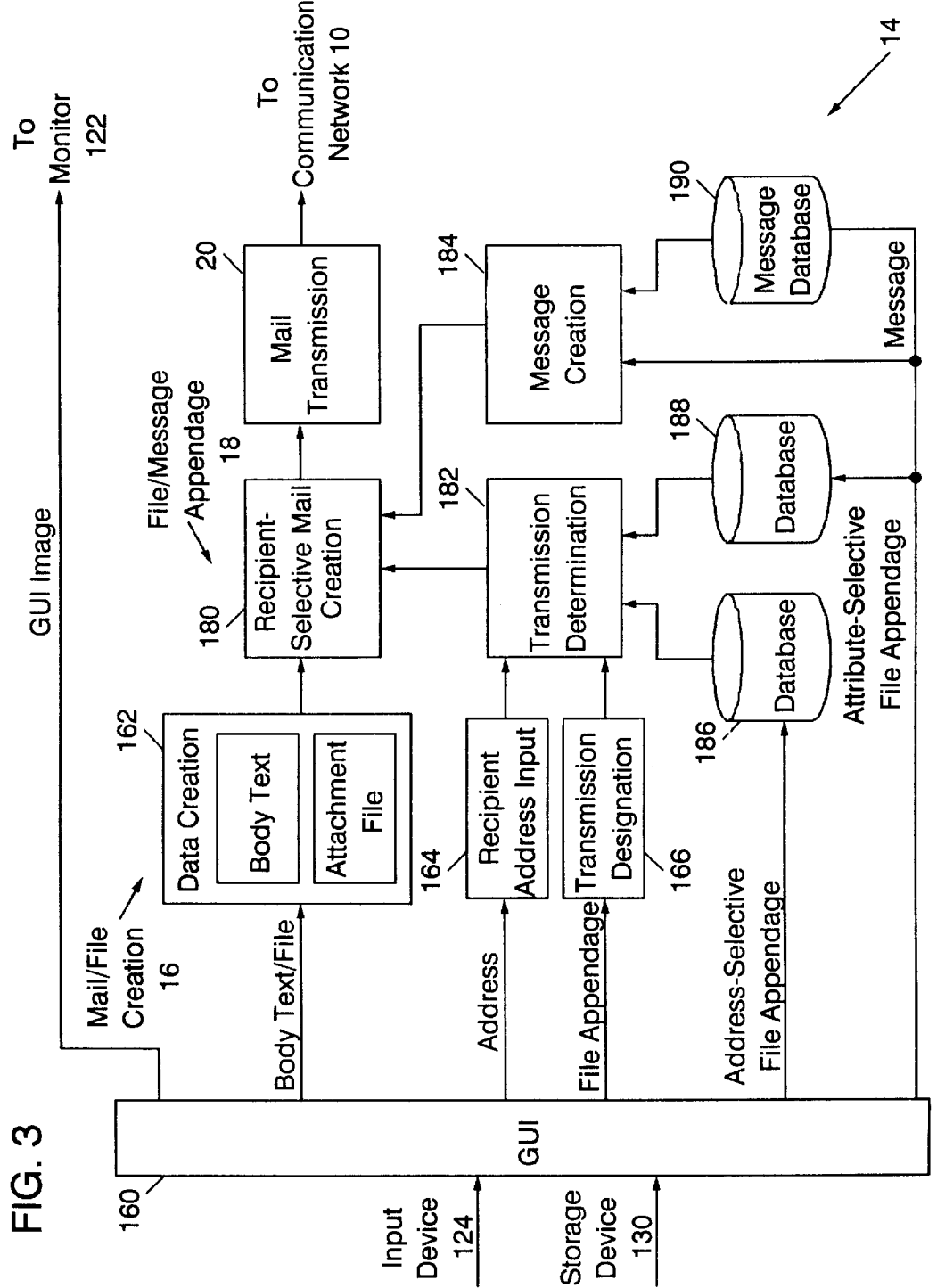
FIG. 3 is a diagram showing a configuration of a mail transmission program executed on a computer system unit shown in FIG. 2.

FIG. 3 shows a configuration of program 14 executed on the computer system unit 120 of FIG. 2. While, in an actual environment, the computer system unit 120 is provided with a program for receiving e-mail transmitted via the communication network 10, such a program is not shown or explained herein for the sake of brevity of description.

As shown, program 14 comprises a mail/file creation part 16, a file/message appendage part 18 and a mail transmission part 20. The mail/file creation part 16 comprises a GUI part 160, a data creation part 162, a recipient address input part 164 and a transmission designation part 166. The file/message appendage part 18 comprises a recipient-selective mail creation part 180, a transmission determination part 182, a message creation part 184, an address-selective file appendage database (DB) 186, an attribute-selective file appendage DB 188 and a message DB 190. Program 14 may be stored in the storage device 130 and loaded into memory (not shown) in the computer system unit 120 for execution thereon to implement the following functions.

The mail transmission program 14, displays a GUI image for manipulation to a user and, in response to the user's manipulation with respect to the displayed GUI image, it accepts input or designation such as text data representing body text (which may be hereinafter called "body text" in a simpler form) of an e-mail, one or more attachment files, TO addresses identifying primary recipients of the e-mail, CC addresses identifying secondary recipients, and BCC addresses identifying those secondary recipients that are not visible to other recipients. For the sake of brevity of description hereinbelow, said characteristics of the TO, CC and BCC addresses may be alternatively called "attributes".

If a user designates for each recipient whether or not an attachment file is to be transmitted thereto, the mail transmission program 14 automatically appends the attachment file to e-mail destined for only those recipients who have been identified to receive the attachment file, whereas (instead of appending the attachment file) it appends said message only to e-mail destined for other recipients who have not been identified to receive the attachment file. Alternatively, in a similar case, the mail transmission program 14 appends the attachment file to e-mail destined for only those recipients who have been identified to receive the attachment file, whereas it appends another message, which indicates that no attachment file has been attached, to e-mails destined for other recipients who have not been identified to receive the attachment file.

Also, responsive to the attributes, the mail transmission program 14 automatically creates e-mail each of which may include one or more appended attachment files and/or e-mail each of which may include an appended message for indicating that the attachment files have been attached to another e-mail. By way of example, the mail transmission program 14 not only automatically creates e-mail (destined for the TO addresses) each of which may include a body text and one or more attachment files, but also e-mail (destined for the CC/BCC addresses) each of which may include the CC/BCC addresses, said body text and a message indicating that the attachment files have been attached to the e-mail destined for the TO addresses.

Further, responsive to various conditions such as presence/absence of an attachment file, whether or not the attachment file is to be appended, presence/absence of identified CC/BCC addresses and the like, the mail transmission program 14 selectively creates e-mail and appropriately changes contents thereof. That is, in the example above, if either a To address or a CC/BCC address is not identified by a user, the mail transmission program 14 will create e-mail destined only for the indicated address. Also, if an attachment file is not included or identified by a user, the mail transmission program 14 will not append an attachment file to e-mail destined for the TO addresses nor will it append a message to e-mail destined for the CC/BCC addresses.

The mail transmission program 14 transmits e-mail created by the e-mail creation function to the communication nodes 12 identified by the mail addresses respectively via the communication network 10.

GUI part 160, which is a constituent of the mail/file creation part 16, displays GUI images on the monitor 122 for controlling transmit/receipt manipulations of e-mail. GUI part 160 accepts of user's manipulations performed using the input device 124 in response to GUI images for inputting text data of a body text, one or more attachment files (body text/file), mail addresses, file appendage, address-selective file appendage, attribute-selective file appendage and a message. Then, GUI 160 outputs such information to the data creation part 162, recipient address input part 164, transmission designation part 166, address-selective file appendage DB 186, attribute-selective file appendage DB 188 and the message DB 190.

Also, this GUI 160 is responsive to storing said input body text/file, mail addresses, file attachment, address-selective file appendage, attribute-selective file appendage and message into the storage device 130. Further, this GUI 160 is responsive to regenerating such information stored into the storage device 130 and to output the regenerated information to the data creation part 162, recipient address input part 164, transmission designation part 166, address-selective file appendage DB 186, attribute-selective file appendage DB 188 and message DB 190.

From the body text/file input from the GUI 160, the data creation part 162 creates one or more attachment files and text data of a body text that is common to all e-mail and, then, outputs the created body text and the attachment files to the recipient-selective mail creation part 180 of the file/message appendage part 18.

The recipient address input part 164 stores the mail addresses inputted from the GUI part 160 in association with the attributes and, then, outputs the stored mail addresses to the transmission determination part 182 of the file/message appendage part 18.

The transmission designation part 166 stores the file appendage information inputted from the GUI part 160 for associating the mail addresses with the attachment files and, then, outputs the stored file appendage information to the transmission determination part 182. Note that the file appendage information indicates which attachment file is to be appended to which e-mail. The e-mail subject to such appendage may be destined for mail addresses of specific attributes, or they may be destined for mail addresses that are specifically set up to be attached with files irrespective of the attributes.

The address-selective file appendage DB 186, which is a constituent of the file/message appendage part 18, stores the address-selective file appendage information inputted from the GUI part 160, i.e., such information for indicating that the attachment files are to be appended to e-mail destined for mail addresses, irrespective of the attributes thereof. Then, DB 186 outputs the stored address-selective file appendage information to the transmission determination part 182.

FIGS. 4A, 4B and 4C illustrate input manipulations of the address-selective file appendage information. First, the GUI part 160 displays a TO address (addr1), CC addresses (addr2, addr3), inputted by a user via the input device 124, in a window of a GUI image as shown in FIG. 4A. If the user clicks one of the CC addresses, "addr3", using the mouse 128, the GUI part 160 accepts this manipulation and displays an icon as shown in FIG. 4B for interrogating whether or not an attachment file is to be appended.

If the user clicks the icon shown in FIG. 4B, the GUI part 160 displays a message (mark of a clip), as shown in FIG. 4C, in a window of a GUI image at the mail address "addr3", thereby indicating that the same attachment file destined for the TO address is to be appended to an e-mail destined for a secondary recipient identified by this mail address. Then, the GUI part 160 outputs such accepted information to the transmission designation part 166.

The attribute selective file appendage DB 188(see FIG. 3) stores the attribute-selective file appendage information input from the GUI part 160, i.e., information indicating that attachment files are to be appended to e-mail destined for mail addresses having the attributes of TO, CC and BCC. Then, this DB 188 outputs the stored attribute-selective file appendage information to the transmission determination part 182.

The message DB 190 stores messages inputted from the GUI part 160 and outputs the stored messages to the message creation part 184. If attachment files are appended to only some of the e-mail, the exemplary messages stored into this DB 190 may be comprised of text, graphics and/or symbols to be embedded in other e-mail for indicating a fact that the attachment files are appended to only some of the e-mail, a fact that no attachment file is appended, and file names of the attachment files, or mail addresses to which the attachment files are appended.

Alternatively, another type of message may comprise text or the like to be embedded in some of the e-mail for indicating that no attachment files are appended.

The message creation part 184 outputs one of the messages stored into the message DB 190, selected by a user using the input device 124 in response to a GUI image, to the recipient-selective mail creation part 180.

The transmission determination 182 is responsive to the file appendage information inputted from the transmission designation part 166 and the address-selective file appendage information inputted from the recipient address input part 164 or the attribute-selective file appendage information inputted from the transmission designation part 166. From this input, part 182 determines whether or not attachment files are to be appended to e-mail destined for mail addresses inputted from the recipient address input part 164, and based on such a determination, it controls the recipient-selective mail creation part 180.

That is, if the file appendage information indicates that no attachment file is to be appended, part 182 causes the recipient-selective mail creation part 180 to not append any attachment file to e-mail destined for all of the mail addresses.

Also, if the file appendage information indicates that attachment files are to be appended, part 182 causes the recipient-selective mail creation part 180 to append attachment files to e-mail destined for mail addresses indicated by the address-selective file appendage information and the attribute-selective file appendage information, whereas messages are appended to other e-mail.

Further, if the file appendage information indicates that different attachment files are to be appended to e-mail of different attributes respectively, part 182 causes the recipient-selective mail creation part 180 to separately append attachment files, which differ among different attributes, to e-mail destined for each of the recipients' mail addresses.

Moreover, if the file appendage information indicates that a common attachment file is to be appended to e-mail destined for mail addresses indicated by the address-selective file appendage information irrespective of attributes thereof, part 182 causes the recipient-selective mail creation part 180 (to take precedence over the aforesaid attachment of attachment files in accordance with attributes of mail addresses, and) to append the common attachment file to e-mail destined for mail addresses indicated by the address-selective file appendage information.

Under the control of the transmission determination part 182, part 180 uses the body text/attachment files input from the data creation part 162 and the message input from the message creation part 184 to create e-mail and, then, outputs the created e-mail to the mail transmission part 20.

That is, if the transmission determination part 182 dictates that no attachment file is to be appended to e-mail destined for all of the mail addresses, this part 180 creates e-mail including all of the mail addresses and body text, and then outputs them to the mail transmission part 20.

Also, if the transmission determination part 182 dictates that attachment files are to be appended to e-mail only destined for mail addresses indicated by the address-selective file appendage information and the attribute-selective file appendage information, this part 180 creates e-mail that include the mail addresses indicated by the address-selective file appendage information and the attribute-selective file appendage information, body texts and attachment files, together with e-mail that include mail addresses other than the ones indicated by the address-selective file appendage information or the attribute-selective file appendage information, body text and messages, thereby to output the same to the mail transmission part 20.

Further, if the transmission determination part 182 dictates that attachment files, which differ among different attributes, are to be separately appended to e-mail destined for each of the recipients' mail addresses, this part 180 creates e-mail each including, for example, a TO address, a body text, an attachment file for the TO address, and a message indicating that the attachment files for CC/BCC addresses are appended to e-mail destined for the CC/BCC addresses, together with e-mails each including, for example, the CC/BCC addresses, the body text, a message indicating that the attachment file for the TO address is appended to the e-mail destined for the TO address, thereby to output the same to the mail transmission part 20.

Moreover, if the transmission determination part 182 dictates that a common attachment file is to be appended to e-mail destined for mail addresses indicated by the address-selective file appendage information, part 180 creates e-mail including, for example, a TO address except for the ones indicated by the address-selective file appendage information, a body text, an attachment file for the TO address, and a message indicating that the attachment files for CC/BCC addresses and for the mail addresses indicated by the address-selective file appendage information are appended to e-mail destined for the CC/BCC addresses and for the mail addresses indicated by the address-selective file appendage information respectively, e-mail each including, for example, the CC/BCC addresses except for the ones indicated by the address-selective file appendage information, the body text, attachment files for the CC/BCC addresses, a message indicating that the attachment files for the TO address and for the mail addresses indicated by the address-selective file appendage information are appended to the e-mail destined for the TO address and for the mail addresses indicated by the address-selective file appendage information, respectively, together with a third form of e-mail each including, for example, the mail addresses indicated by the address-selective file appendage information, the body text, attachment file for these mail addresses, and a message indicating that the attachment files for the TO, CC/ BCC addresses are appended to e-mail destined for the TO, CC/ BCC addresses respectively, thereby outputting the same to the mail transmission part 20.

The mail transmission part 20 controls communication with the communication network 10 via the communication device 140, thereby to transmit e-mails inputted from the recipient-selective mail creation part 180 to the communication network 10.

Figure 5:
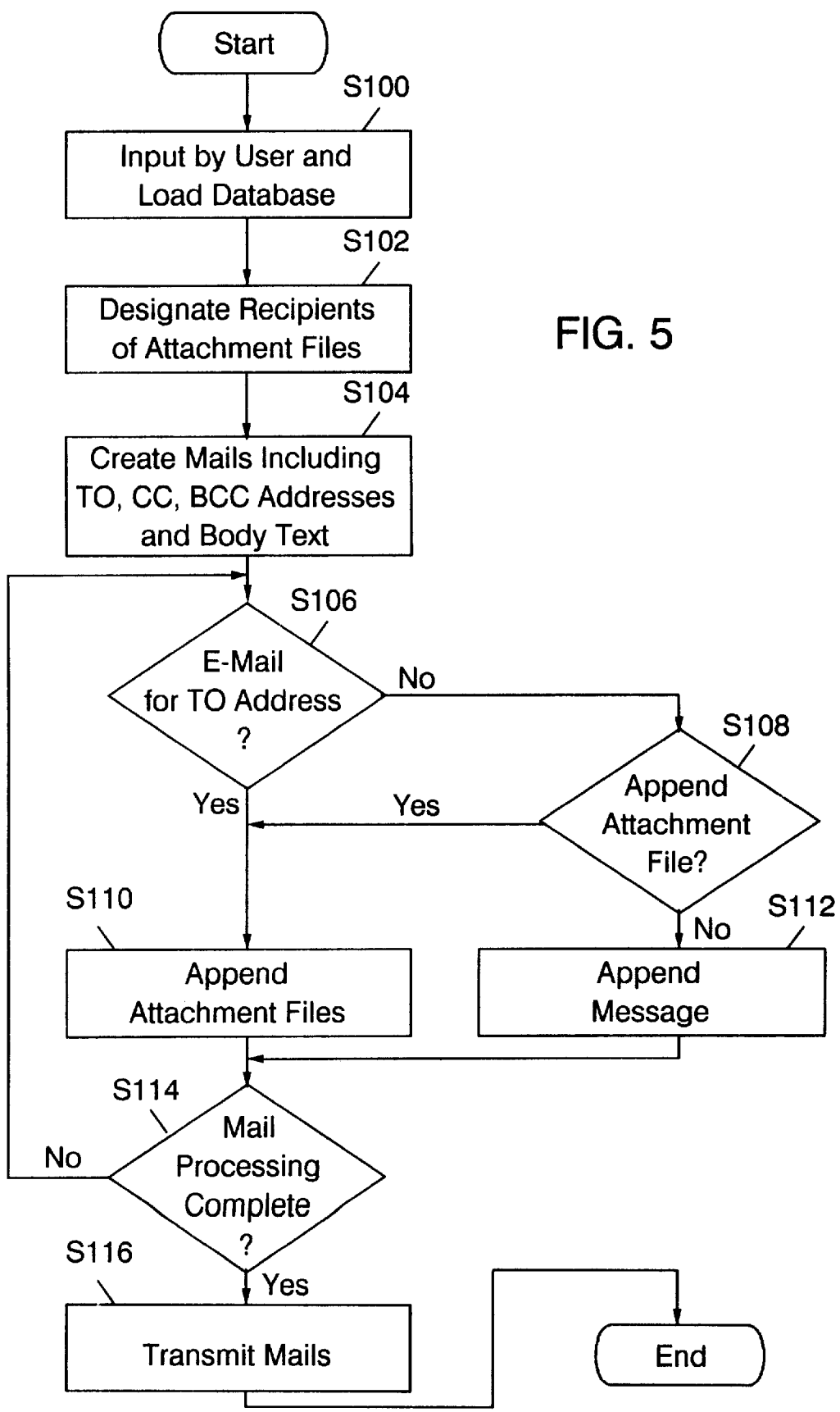
FIG. 5 is a flow chart showing operation of a communication node shown in FIGS. 1 and 2 (a mail transmission program shown in FIG. 3.

With reference to FIG. 5, operations of the communication node 12 centering on the mail transmission program 14 will be described with respect to the simplest case where an attachment file is appended to an e-mail destined for a TO address only and no attachment file is appended to e-mail destined for CC/BCC addresses.

At step 100 (S100), in response to a GUI image displayed on the monitor 122 by the GUI part 160 of the mail transmission program 14, when a user manipulates the input device 124 to input/designate the TO, CC/BCC addresses, a body text, an attachment file and messages, then the GUI part 160 outputs information representing these inputs to the data creation part 162 of the mail/file creation part 16, the address-selective file appendage DB 186, attribute-selective file appendage DB 188 and message DB 190 of the file/ message appendage part 18. Also, the transmission determination part 182 loads address-selective file appendage information and attribute-selective file appendage information from the address-selective file appendage DB 186 and the attribute-selective file appendage DB 188, whereas the message creation part 184 loads messages from the message DB 190.

At step 102 (S102), when the user manipulates the input device 124 to designate that an attachment file is to be appended to an e-mail destined for a mail address of the TO attribute, or when the user clicks the TO address only in the GUI image as shown in FIG. 4A to designate that an attachment file is to be appended to an e-mail destined for the TO address, the GUI part 160 accepts such designation and outputs the same as file appendage information to the recipient address input part 164. In response thereto, this part 164 associates the attachment file with the TO address in accordance with the inputted file appendage information.

At step 104 (S104), the recipient-selective mail creation part 180 creates an e-mail destined for the TO address that includes a body text input from the data creation part 162 and the TO address, together with e-mail destined for the CC/BCC addresses each including the body text and the CC/BCC addresses.

At step 106 (S106), the transmission determination part 182 determines whether or not the currently processed e-mail is identified to be appended with an attachment file (in the present example, an e-mail destined for the TO address). If so, the process proceeds to S110, otherwise, it branches to S108.

At step 108 (S108), based on the address-selective file appendage information, the transmission determination part 182 determines whether or not an attachment file is to be appended to the currently processed e-mail. If so, the process proceeds to S110, otherwise, it branches to S112.

At step 110 (S110), the transmission determination part 182 causes the recipient-selective mail creation part 180 to append an attachment file to the currently processed e-mail (in the present example, an e-mail destined for the TO address). Thus, under the control of the transmission determination part 182, the recipient-selective mail creation part 180 appends an attachment file to the e-mail destined for the TO address.

Figure 6:
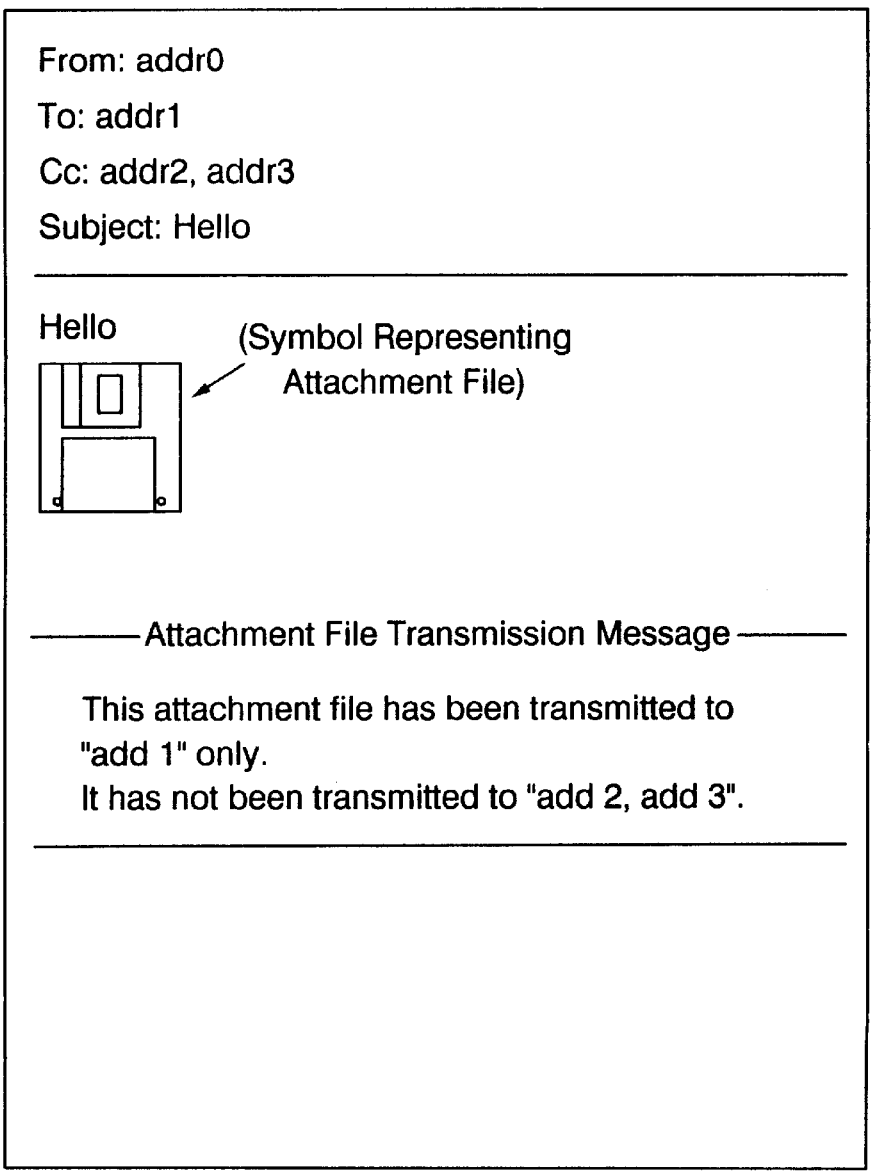
FIG. 6 is a diagram illustrating content of an e-mail destined for the CC/BCC address, which is an e-mail shown in FIG. 4B.

FIG. 6 illustrates content of an e-mail (as shown in FIG. 4B) destined for the CC/BCC addresses. At step 112 (S112), the transmission determination part 182 causes the recipient-selective mail creation part 180 to append a message to the currently processed e-mail (in the present example, e-mail destined for the CC/BCC addresses) to indicate that an attachment file is appended to the e-mail destined for the To address. Thus, under control of the transmission determination part 182, the recipient-selective mail creation part 180 appends the message to the e-mail destined for the CC/BCC addresses.

At step 114 (S114), the transmission determination part 182 determines whether or not processing of all of the e-mail created at S104 is completed. If so, the process proceeds to S116, otherwise it branches to S106 for processing either one of the remaining e-mail.

At step 116 (S116), the recipient-selective mail creation part 180 outputs the created e-mail destined for the TO address and for the CC/BCC addresses to the mail transmission part 20, which in turn transmits e-mail input from the recipient-selective mail creation part 180 to the communication network 10. In this case, the communication network 10 distributes the e-mail to a communication node 12 identified by each address included in the e-mail.

As exemplified above as operations of the communication node 12 (or the mail transmission program 14), appending an attachment file to only an e-mail destined for the TO address that normally needs to have it, without appending any attachment file to e-mail destined for the CC/BCC addresses that do not normally need to have them, it becomes possible to avoid undesirable phenomena such as an unnecessary increase of communication traffic in the communication network 10 and a wasteful use of memory capacity of the memory device 130 at the communication node 12 for sending e-mail destined for the CC/BCC addresses.

Now, a second embodiment of this invention will be described below. Note that the second embodiment comprises a combination of mail clients and a mail server, which are designed to have distributed functions of the mail transmission program 14 shown in FIG. 3, thereby to effectively exploit hardware/software resources at a communication node.

FIG. 7 shows a configuration of a mail system 2, which is used in place of the communication node 12 in the environment of communication system 1 (FIG. 1). As shown, the mail system 2 comprises a single mail server 24 and m units of mail clients 22-1 to 22-m, each coupled to the mail server 24 via a data transmission path 26 such as a connection cable or a LAN. While FIG. 7 shows a configuration of the mail client 22-1 alone for brevity of the drawing, it should be noted that other mail clients 22-2 to 22m have the same configuration. Similarly, other constituents such as the monitor 122, input device 124 and storage device 130 are not shown in this drawing.

The mail client 22 (hereinafter, when an arbitrary one of the mail clients 22-1 to 22-m is referred to, it will be simply called "mail client 22") comprises a computer system unit 120a comparable to the computer system unit 120 shown in FIG. 2, and a communication device 140a comparable to the communication device 140. As e-mail transmission software, it is also provided with the mail/file creation part 16 shown in FIG. 3, and mail transmission part 20a comparable to the mail transmission part 20.

The mail server 24 comprises a communication device 142a, a computer system unit 240 comparable to the computer system unit 120, and a communication device 142b comparable to the communication device 140. As e-mail transmission software, it is also provided with mail receiving part 242, the file/ message appendage part 18 shown in FIG. 3, and mail transmission part 20b comparable to the mail transmission part 20.

Now, those constituents of the mail server 24 that are different from the ones of the communication node 12 will be described.

The communication device 142a receives mail addresses, body text of e-mail, attachment files and messages transmitted from the mail client 22 and, then, outputs them to the mail receiving part 242 of the computer system unit 240.

The mail receiving part 242, provided in the computer system unit 240, controls communication between the mail client 22 and mail server 24 via the communication device 142a. More specifically, this part 242 outputs the mail addresses, body text of e-mail, attachment files and messages input from the mail client 22 to the file/message appendage part 18.

FIG. 8 is a communication sequence diagram of signals transmitted among the mail client 22, mail server 24 and communication network 10 in the environment of the mail system 2 shown in FIG. 7. Similar to the first embodiment, operations of the mail system 2 will be described with respect to the simplest case where an attachment file is to be appended to an e-mail destined for a TO address only and no attachment file is to be appended to e-mail destined for the CC/BCC addresses.

At step 200 (S200), the mail client 22 transmits a connection request signal to the mail server 24. At step 202 (S202), the mail server 24 responds to the connection request signal and returns a connection acknowledge signal, thereby to establish a connection between the mail client 22 and mail server 24.

At step 210 (S210), the mail client 22 transmits such information, which is necessary for creating e-mail destined for the TO address, to the mail server 24. More specifically, at step 212 (S212), the mail client 22 transmits the TO address, which is input/identified in the same manner done as at the communication node 12, to the mail server 24.

At step 214 (S214), the mail server 24 receives the TO address from the mail client 22, and returns an acknowledge signal. At step 216 (S216), the mail client 22 transmits the body text and attachment file (data for the TO address), which are input/identified in the same manner as done at the communication node 12, to the mail server 24. At step 218 (S218), the mail server 24 receives the data for the TO address from the mail client 22, and returns an acknowledge signal.

At step 220 (S220), the mail client 22 transmits such information necessary for creating e-mail destined for the CC/BCC addresses to the mail server 24. More specifically, at step 222 (S222), the mail client 22 transmits the CC/BCC addresses, which are input/identified in the same manner as done at the communication node 12, to the mail server 24. At step 224 (S224), the mail server 24 receives the CC/BCC addresses from the mail client 22, and returns an acknowledge signal.

At step 226 (S226), the mail client 22 transmits the body text and messages (data for the CC/BCC addresses), which are input/identified in the same manner as done at the communication node 12, to the mail server 24. At step 228 (S228), the mail server 24 receives the data for CC/BCC addresses from the mail client 22, and returns an acknowledge signal. At step 230 (S230), the mail client 22 transmits a reset signal to the mail server 24. At step 232 (S232), the mail client 22 transmits a disconnection request signal to the mail server 24.

At step 234 (S234), the mail server 24 receives the disconnection request signal from the mail client 22, and returns a disconnection acknowledge signal, thereby disconnecting the mail client 22 and mail server 24.

When the connection between the mail client 22 and mail server 24 is disconnected, in the same manner as done at the communication node 12, the mail server 24 creates an e-mail destined for the TO address including the TO address, a body text and an attachment file, together with e-mail destined for the CC/BCC addresses each including the CC/BCC addresses, the body text and a message, thereby transmitting the e-mail so created to the communication network 10. In response thereto, the communication network 10 distributes e-mail to the respective recipients.

As described above, in accordance with the mail transmission apparatus and method of this invention, it is possible to transmit e-mail with selectively appended attachment files to only those recipients who need to receive the attachment files, even if a sender of the e-mail designates primary recipients (TO addresses) together with secondary recipients (CC/BCC addresses), respectively.

Also, in accordance with the mail transmission apparatus and method of this invention, it is possible to transmit e-mail each including a body text and one or more attachment files to primary recipients identified by the TO addresses, and to simultaneously transmit e-mail including the body text and a message to secondary recipients identified by the CC/BCC addresses, thereby informing the secondary recipients that the attachment files have been transmitted to the TO addresses.

Further, in accordance with the mail transmission apparatus and method of this invention, it is possible to transmit e-mail with selectively appended attachment files to a plurality of recipients identified in the e-mail on a recipient-selective basis, thereby avoiding undesirable phenomena such as congestion in a network used for transmitting the e-mail or overflow of memories used at the recipients for storing the received e-mail. Further, in accordance with the mail transmission apparatus and method of this invention, it is possible to transmit e-mail with selectively appended attachment files to each of the recipients to allow the recipients to visibly confirm which of the attachment files has been transmitted to which of the recipients.

Further, in accordance with the mail transmission apparatus and method of this invention, it is possible to selectively append any type of data to e-mail by simple manipulations. Moreover, in accordance with the mail transmission apparatus and method of this invention, it is possible to securely inform those recipients who have received e-mail without attachment files that the attachment files have been transmitted to other recipients.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed:

1. An electronic-mail (e-mail) transmission apparatus, comprising:
   means for accepting designation of one or more e-mail addresses;
   means for accepting body text that is common to e-mail destined for each of said e-mail addresses;
   means for accepting one or more attachment files to be attached to the e-mail;
   means for associating at least one subset of e-mail addresses with each of said attachment files, each said subset including at least one of said e-mail addresses;
   means for creating e-mail destined for a given one of said subset of said e-mail addresses, including said body text together with one or more of said attachment files associated with a given one of the e-mail addresses; and
   means for transmitting each said e-mail.

2. The e-mail transmission apparatus of claim 1, further comprising first means for appending a message to e-mail without at least one of said attachment files attached thereto in order to indicate existence of said attachment files.

3. The e-mail transmission apparatus of claim 1, further comprising first means for displaying an address for displaying each of said subsets of said e-mail addresses in association with a message indicating each of said attachment files associated with said subsets.

4. The e-mail transmission apparatus of claim 1, wherein:
   said means for accepting designation accepts designation of one or more e-mail addresses identifying primary recipients of the e-mail (TO addresses), and/or designation of one or more e-mail addresses identifying secondary recipients of the e-mail (secondary addresses);
   said means for associating associates a primary one of said subsets of said e-mail addresses including said TO addresses only and/or a secondary one of said subsets of said e-mail addresses including said secondary addresses only with each of said accepted attachment files; and
   said means for creating e-mail creates e-mail destined for a given one of said TO addresses and including said accepted body text together with one or more of said attachment files associated with said TO addresses, and/or e-mail each being destined for a given one of said secondary addresses and including said accepted body text together with one or more of said attachment files associated with said secondary addresses.

5. The e-mail transmission apparatus of claim 4, wherein:
   said means for accepting accepts one or more attachment files accepts one or more attachment files to be attached to e-mail that is destined for said TO addresses;
   said address-attachment file associating means associates said TO addresses with said accepted attachment files; and
   said means for creating e-mail creates e-mail destined for a given one of said TO addresses and including said body text together with said attachment files associated with said TO addresses, and/or e-mail destined for a given one of said secondary addresses and including said accepted body text.

6. The e-mail transmission apparatus of claim 5, further comprising second means for appending a message operative where said attachment files have been attached to e-mail destined for said TO addresses, for appending a message to each said e-mail destined for said secondary addresses, thereby indicating that said attachment files have been attached to the e-mail destined for said TO addresses.

7. The e-mail transmission apparatus of claim 5, further comprising second means for displaying an address for displaying said TO addresses together with said secondary addresses, and for displaying messages indicating said attachment files associated with said displayed TO addresses.

8. A mail server apparatus adapted for accepting from a mail client apparatus at least one e-mail address, a body text common to e-mail destined for each said e-mail address and one or more attachment files to be attached to the e-mail, and for transmitting the e-mail, comprising:
   address-attachment file associating means for associating at least one subset of said at least one e-mail address with each of said attachment files, each said subset including one or more of said at least one e-mail address;
   e-mail creating means for creating e-mail destined for a given one of said subset of said at least one e-mail address, each e-mail including said body text with at least one of said attachment files associated with a given one of said at least one e-mail address; and
   e-mail transmitting means for transmitting each said e-mail.

9. A mail client apparatus adapted for outputting to a mail server apparatus at least one e-mail address, a body text that is common to e-mail destened for each said e-mail address and at least one attachment file to be attached to said e-mail, thereby enabling the mail server apparatus to accept at least one subset of said at least one e-mail address, each said subset including at least one of said at least one e-mail address, and said attachment file, to create said e-mail destined for a given one of said at least one subset of said at least one e-mail address, each said e-mail including said body text together with at least one of said attachment files associated with a given one of said at least one e-mail address, and to transmit said e-mail, comprising:

address designation accepting means for accepting designation of at least one e-mail address;

body text accepting means for accepting a body text that is common to e-mail destined for each of said at least one e-mail address; and attachment file accepting means for accepting at least one attachment file to be attached to said e-mail.

10. An e-mail transmission method, comprising the steps of:

(a) accepting designation of at least one e-mail address;

(b) accepting a body text common to e-mail destined for each of said at least one e-mail address;

(c) accepting at least one attachment file for attachment to the e-mail;

(d) associating at least one subset of said at least one e-mail address with said at least one attachment file, each said subset including said at least one e-mail address;

(e) creating e-mail destined for a given one of said at least one subset, including said accepted body text together with one or more of said attachment files associated with a given one of said at least one e-mail address; and (f) transmitting each said e-mail.

11. The e-mail transmission method of claim 10, wherein:

said step (a) accepts designation of at least one e-mail address identifying primary recipients of the e-mail (TO addresses), and/or designation of at least one e-mail address identifying secondary recipients of the e-mail (secondary addresses);

said step (d) associates a primary one of said at least one subset of said at least one e-mail address including said TO addresses only and/or a secondary one of said at least one subset of said at least one e-mail address including said secondary addresses only with each of said at least one attachment file; and said step (e) creates e-mail destined for a given one of said TO addresses and including said body text together with one or more of said at least one attachment file associated with said TO addresses, and/or e-mail each being destined for a given one of said secondary addresses and including said accepted body text together with said at least one attachment file associated with said secondary addresses.

12. A computer readable storage medium for storing a program that is executable by the computer to carry out method steps of:

(a) accepting designation of at least one e-mail address;

(b) accepting a body text common to e-mail destined for each of said at least one e-mail address;

(c) accepting at least one attachment file to be attached to said e-mail;

(d) associating at least one subset of said at least one e-mail address with each of said at least one attachment file, each said subset including at least one of said at least one e-mail address;

(e) creating e-mail destined for a given one said subset, each said e-mail including said accepted body text together with said at least one attachment file associated with a given one of said at least one e-mail address; and (f) transmitting said e-mail.

13. The computer readable storage medium of claim 12, wherein the program is executable by the computer to carry out an additional method step of:

appending a message to any e-mail without at least one of said at least one attachment file attached thereto in order to indicate the existence of said at least one attachment file.

14. The computer readable storage medium of claim 12, wherein the program is executable by the computer to carry out an additional method step of:

displaying each of said at least one subset associated with a message indicating each of said at least one attachment file associated with said subset.

15. The computer readable storage medium of claim 12, wherein:

said step (a) accepts designation of at least one e-mail address identifying primary recipients of the e-mail (TO addresses), and/or designation of at least one e-mail address identifying secondary recipients of the e-mail (secondary addresses);

said step (d) associates a primary one of said at least one subset of said at least one e-mail address including said TO addresses only and/or a secondary one of said at least one subset of said at least one e-mail address including said secondary addresses only with each of said at least one attachment file; and said step (e) creates e-mail destined for a given one of said TO addresses and including said body text together with at least one of said at least one attachment file associated with said TO addresses, and/or e-mail destined for a given one of said secondary addresses and including said body text together with at least one of said at least one attachment file associated with said secondary addresses.

16. The computer readable storage medium of claim 15, wherein:

step (c) accepts at least one attachment file to be attached to the e-mail destined for said TO addresses;

said step (d) associates said TO addresses with said at least one attachment file; and said step (e) creates e-mail destined for a given one of said TO addresses and including said body text together with said at least one attachment file associated with said TO addresses, and/or e-mail destined for a given one of said secondary addresses including said body text.

17. The computer readable storage medium of claim 16, wherein the program is executable by the computer, in a case where said at least one attachment file has been attached to the e-mail destined for said TO addresses, to carry out an additional method step of:

appending a message to each said e-mail destined for said secondary addresses in order to indicate that said at least one attachment file has been attached to e-mail destined for said TO addresses.

18. The computer readable storage medium of claim 16, wherein the program is executable by the computer to carry out an additional method step of:

displaying said TO addresses together with said secondary addresses, and displaying messages indicating said at least one attachment file in association with said displayed TO addresses.

19. A computer readable storage medium for storing a program adapted for use in a mail server apparatus for causing the mail server apparatus to accept from a mail client apparatus at least one e-mail address, a body text common to e-mail destined for each of said at least one e-mail address and at least one attachment file to be attached to the e-mail, and to transmit the e-mail using them, said program being executable by the computer to carry out method steps of:

associating at least one subset of said at least one e-mail address with each of said at least one attachment file, each said subset including at least one of said at least one e-mail address;

creating e-mail destined for a given one said subset of said at least one e-mail address, each said e-mail including said body text with at least one of said at least one attachment file associated with a given one of said at least one e-mail address; and transmitting each said e-mail.

20. A computer readable storage medium for storing a program adapted for use in a mail client apparatus for causing the mail client apparatus to output to a mail server apparatus at least one e-mail address, a body text common to e-mail destined for each of said at least one e-mail address and at least one attachment file to be attached to the e-mail, thereby enabling the mail server apparatus to accept at least one subset of said at least one e-mail address, each said subset including at least one said at least one e-mail address, and said at least one attachment file, to create e-mail destined for a given one said at least one subset of said at least one e-mail address, each said e-mail including said body text with at least one said at least one attachment file associated with a given one of said at least one e-mail address, and to transmit each said e-mail, the program being executable by the computer to carry out method steps of:

accepting designation of at least one e-mail address;

accepting a body text common to e-mail destined for each said at least one e-mail address; and accepting at least one attachment file for attachment to the e-mail.

* * * * *